United States Patent [19]
Dirx

[11] Patent Number: 5,649,411
[45] Date of Patent: Jul. 22, 1997

[54] METHOD FOR DAYLIGHT LOADING A PHOTOGRAPHIC LIGHT-SENSITIVE MATERIAL

[75] Inventor: Lieven Dirx, Oud-Turnhout, Belgium

[73] Assignee: Agfa-Gevaert N.V., Mortsel, Belgium

[21] Appl. No.: 357,743

[22] Filed: Dec. 16, 1994

[51] Int. Cl.$^6$ .................. B65B 25/00; B65D 85/00
[52] U.S. Cl. .................. 53/492; 53/381.2; 53/449; 53/463; 206/455
[58] Field of Search .................. 206/455, 454, 206/449; 53/463, 461, 464, 449, 174, 170, 375.7, 375.2, 373.4, 381.2, 381.1, 492, 141, 412

[56] References Cited

U.S. PATENT DOCUMENTS

| | | | |
|---|---|---|---|
| 3,741,386 | 6/1973 | Schmidt | 206/455 |
| 4,909,389 | 3/1990 | Plessers et al. | 206/455 X |
| 5,055,869 | 10/1991 | Di Pietro | 206/455 X |
| 5,139,148 | 8/1992 | Peeters et al. | 206/455 |

FOREIGN PATENT DOCUMENTS

| | | | |
|---|---|---|---|
| 0536776 | 4/1993 | European Pat. Off. | 206/455 |
| 2803050 | 8/1979 | Germany | 206/455 |

*Primary Examiner*—James F. Coan
*Attorney, Agent, or Firm*—William J. Daniel

[57] ABSTRACT

A stack of photographic sheets is arranged between two rectangular sheets of lighttight wrapping foil. The foil sheets are of a size larger than the stack so that their side margins project laterally exteriorly of the stack in sandwiched relation to form flaps on all sides of the stack. The flaps are initially lighttightly closed, e.g. sealed together, along their peripheral margins. The wrapped stack is lighttightly enclosed within a package having a base and a cover. The base has upstanding side walls arranged in a rectangle large enough to contain the wrapped stack and may include a solid bottom wall. The cover is light-impervious and has margins overlying the top edges of the base side walls in lighttight clamping contact therewith with inner regions of the projecting sheet flaps gripped therebetween to lighttightly close said flaps inwardly of their edges. The initial closure along the flap margins can now be removed to free edges of the flaps. When, after the package is placed within a lighttight compartment and the cover is lifted from the base, the uppermost of the foil wrapping sheets being no longer connected to the other foil wrapping sheet can be readily removed, rendering the stack accessible for removal of its sheets.

22 Claims, 5 Drawing Sheets

METHOD FOR DAYLIGHT LOADING A PHOTOGRAPHIC LIGHT-SENSITIVE MATERIAL

BACKGROUND OF THE INVENTION

1. Field of the Invention

The present invention relates to a method for lighttightly wrapping a stack of photographic light-sensitive sheets and loading such stack by daylight in a lighttight cabinet, and to a photographic sheet stack lighttightly wrapped in backfolded wrapping sheets.

2. Description of the Prior Art

It is known to avoid the use of a darkroom for loading light-sensitive sheets into a sheet processor such as a cassette-loading apparatus, which automatically reloads radiographic film cassettes with a fresh film after an X-ray exposed film has been removed.

These processors usually comprise a film supply magazine in the form of a drawer or the like that can be opened and into which a lighttightly wrapped stack of film is put in daylight conditions. Next, the drawer is closed and an appropriate mechanism cuts or peels the wrapper of the films so that this can be removed from the film stack manually or automatically. One example of suchlike system is disclosed in U.S. Pat. No. 4,909,389 relating to a film-sheet package for use in the magazine of a reloader for radiographic film cassettes. The film wrapper is in the form of a sleeve having a sealed flap for engagement by a winding mechanism. The end opposite to the sealed flap has an open flap folded inwardly to lighttightly close the package. Opening of the package occurs by winding the sealed flap by means of a winding mechanism, the film stack as such being withheld, so that the sleeve is stripped from the stack of film sheets.

While this system works satisfactorily for sheetlike materials such as radiographic film, it is unsuited for larger and heavier sheets such as aluminium offset printing plates, that are image-wise exposed in a plate setter. The size of these plates can amount to 81×111 cm, and the weight of a stack of 30 of such plates can amount to 32 kgs.

Attempts have been made to provide a package form that readily lends itself to daylight loading of such plates in a plate setter. However, these package concepts are expensive and/or are ecologically unacceptable.

SUMMARY OF THE INVENTION

It is one object of the present invention to provide a method for lighttightly wrapping photographic light-sensitive material and loading it by daylight in a lighttight cabinet, in particular in a plate setter for the image-wise exposure of aluminium offset printing plates.

It is a further object of the invention to provide a novel photographic sheet package which readily lends itself to daylight loading.

STATEMENTS OF THE INVENTION

In accordance with the method according to the present invention, a method for daylight loading a photographic light-sensitive material into a lighttight cabinet comprises the steps of wrapping said photographic light-sensitive material in a lighttight wrapper and providing said wrapper with a first lighttight closure near an edge of said material, providing said wrapper with a clamping, second lighttight closure inward of said first one and capable of taking over the function of the first one, opening said first closure in daylight and loading said photographic material while its wrapper is still closed by said second closure in said opened cabinet, and lighttightly closing said cabinet, unclamping said second closure and removing the wrapper at least partly from the light-sensitive material to render the latter accessible to further treatment.

The word "cabinet" stands in the present specification for any device which gives the photographic material some treatment. This may be the loading of a fresh film sheet in radiographic film cassettes, the imagewise exposure of film sheets or plates, as in an image setter, or simply the dispensing of film sheets removed from their package to another apparatus for exposing, developing, rinsing, etc. the sheets.

The lighttight wrapper of the photographic material may be formed by two wrapping sheets sealed to each other along their peripheral margins, but may also be a bag sealed at its opening thereby to provide said first closure.

The inventive method of loading a lighttightly wrapped photographic light-sensitive material by daylight in a lighttight cabinet is also characterised by the steps of clamping a package comprising a light-sensitive material wrapped in a flexible lighttight wrapper having a peripheral lighttight closure the location of which is spaced from the periphery of said light-sensitive material, between clamping means engaging the wrapper of the package along a peripheral clamping zone located between the peripheral lighttight closure of the wrapper and the periphery of the wrapped material to lighttightly clamp two adjacent plies of the wrapper onto each other, opening the lighttight wrapper round about said peripheral clamping zone, and locating the thus clamped and opened package in said opened cabinet, lighttightly closing said cabinet, opening the clamping means and removing the wrapper at least partly from said package to set free said light-sensitive material.

The term "light-sensitive material" stands for sheet- and weblike material. The present description concerns aluminium lithographic printing plates in particular, but it should be understood that any other type of photographic material on a paper, cellulose triacetate, polyester, or glass base, etc. can be used as well in the method of the invention.

In the case of sheet-like photographic material, the sheets or plates can be directly stacked onto each other but they can remain also separated from each other by interleaving foils.

The lighttight clamping of said package can be done by means of two co-operating clamping surfaces that can be urged onto each other, but said clamping can also occur by means of the lateral walls of the base and telescoping cover of a set-up box into which the package is located.

Suitable embodiments of the method according to the invention are as follows.

The lighttight closure of the wrapper is formed by a peelable seal, and the opening of the package occurs by peeling said seal.

The lighttight closure of the wrapper is formed by a non-peelable seal, and the opening of the package occurs by cutting at least one of two adjacent plies of the wrapper along a peripheral line located between the peripheral clamping zone and said seal.

The lighttight closure of the wrapper is formed by backfolded marginal portions of two congruent wrapping sheets. These marginal portions can be backfolded to and temporarily withheld at a position where they remain beyond the reach of said clamping means. These back-folded margins can be withheld from spontaneous unfolding by strips of self-adhesive tape, which can function also as warranty seals.

The present invention includes also a novel photographic sheet package.

In accordance with the invention, suchlike photographic sheet package comprises a telescope type set-up box containing a stack of light-sensitive sheets lighttightly wrapped between two rectangular sheets of wrapping foil of a size larger than that of the sheets, the flaps of skid wrapping extending beyond the package being backfolded on the package and being lighttightly closed near their margins allowing lighttight removal of the wrapped stack from the box and next relocation therein with the flaps unfolded and passing through the adjacent lateral walls of the base and cover of the box, the lighttight closure remaining outside of the box.

According to a suitable embodiment of the invention, the distance between the lighttight closure and the periphery of the stack of sheets amounts to at least four times the thickness of the stack.

The lighttight closure of the wrapping foils can be formed by a heatseal of their corresponding edges, but also by marginal portions of the flaps back-folded onto each other.

BRIEF DESCRIPTION OF THE DRAWINGS

The invention will be described hereinafter by way of example with reference to the accompanying drawings, wherein.

DETAILED DESCRIPTION OF THE INVENTION

Figure 1:
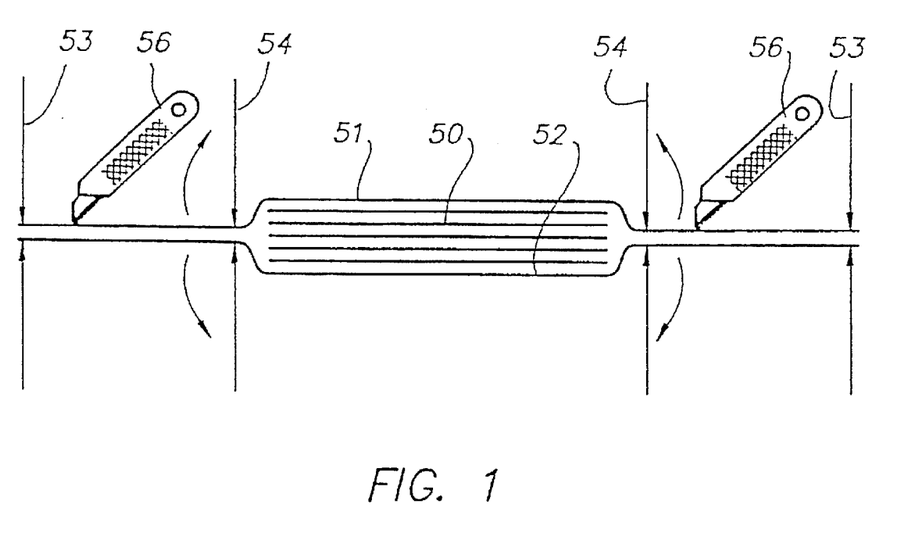
FIG. 1 illustrates the principle of the present invention.

The drawing of FIG. 1 diagrammatically illustrates the principle of the present invention.

A stack of photographic light-sensitive film sheets 50 is lighttightly wrapped between two lighttight wrapping foils 51 and 52 that notably extend over the four lateral sides of the stack. The foils have a first peripheral lighttight closure near their ends as indicated by arrows 53. This closure can be formed by heatseals, folded marginal portions of the wrapping foils, etc.

Next a second lighttight closure is produced that is located between the stack and the first closure, as indicated by arrows 54. This second closure is obtained by clamping the two wrapping foils between suitable clamping means.

Then the wrapping foils are peripherally cut at a location between the first and second closure as diagrammatically shown by knives 56. The second closure takes over the function of the first one so that sheets 50 remain lighttightly protected although the sheet wrapping is in fact opened.

The thus clamped package is now ready for movement into a lighttight device in which the clamping means will be opened and at least one wrapping foil will be (partly) removed so that the sheets can be gripped one by one by a suitable dispensing mechanism for their feeding to a further destination.

Referring to FIGS. 2a to 2g, seven consecutive steps are shown illustrating the execution of a first embodiment of the method according to the invention.

Figure 2A:
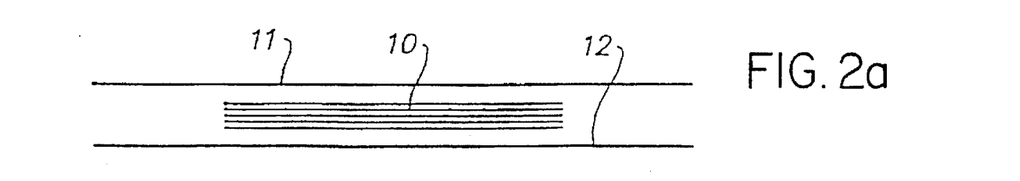
FIGS. 2a–2g illustrate a first embodiment of the method according to the invention.
Figures 2B, 2C:
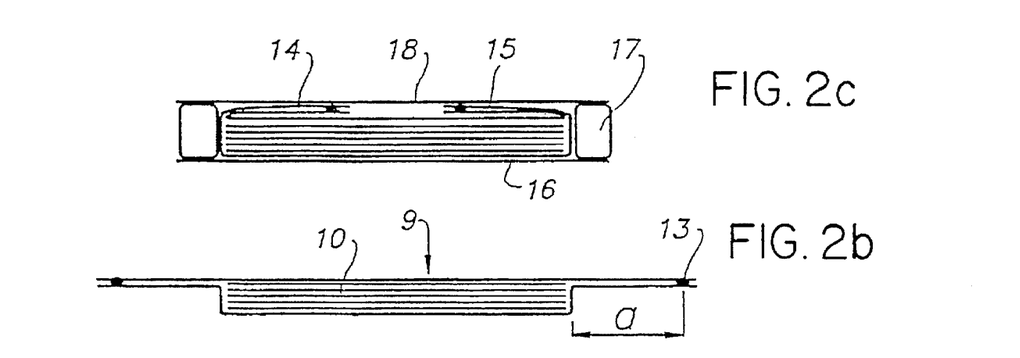

FIG. 2a shows a stack 10 of aluminium lithographic printing plates, which may be conventional printing plates that are blue-sensitive if their image-wise exposure will occur scanningwise in an imagesetter by means of a modulated laser, or red-sensitive if they are intended for being integrally exposed to an original image in an optical camera. Two foils 11 and 12 of wrapping material are used to wrap the stack as shown in FIG. 2b. Foils 11 and 12 are air- and lighttight foils known in the art, such as blackpigmented polyethylene foils either of a single or a multiply composition. The foils have a heatsealable layer facing stack 10 and are heatsealed to each other near their margins to form a peripheral seal 13 whereby the wrapped sheets are air- and lighttightly enclosed, see FIG. 2b. The distance a separating seal 13 from the peripheral edge of stack 10 depends on the type of dispenser, the thickness of the stack, etc. A suitable value of a is between 4 and 10 times the thickness of the pack.

Preferably, the air is removed up to a given degree from the package so that atmospheric pressure firmly keeps the plates together. Interleaving foils can optionally be provided to protect the light-sensitive surface of the plates.

Figure 3:
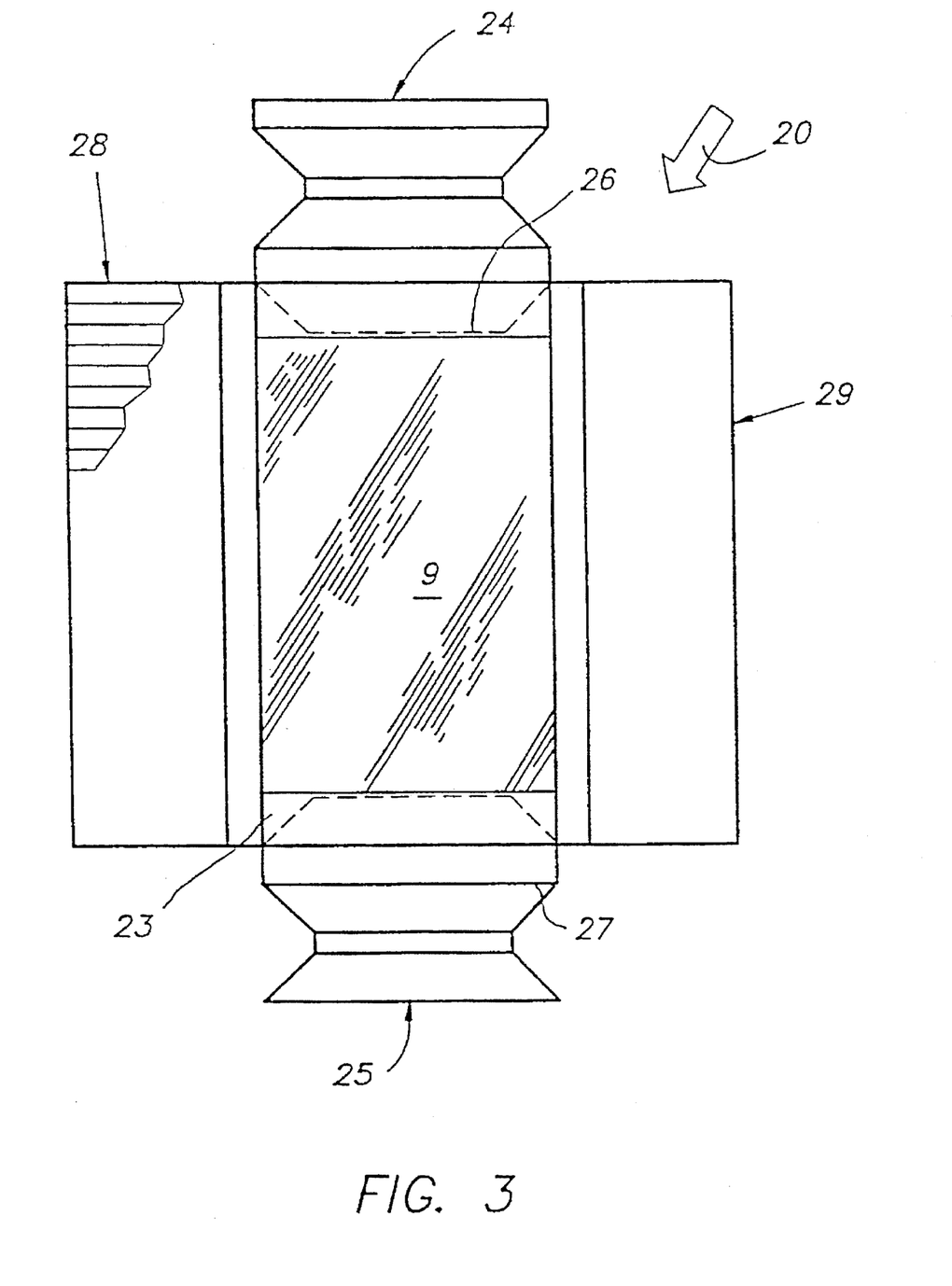
FIG. 3 shows one embodiment of an etui for a sheet package.

Next, package 9 is put in a box or etui forming a packaging protecting the wrapped plates from common transport conditions. The four wrapping flaps are folded on top of the plate stack, as illustrated for the transverse flaps 14 and 15, and the pack is placed in an etui comprising a bottom 16, a peripheral frame 17 and a cover 18, see FIG. 2c. The etui is shown diagrammatically only, and therefore a more detailed embodiment is shown in FIG. 3 wherein 20 is a corrugated board cut and creased to form the package. After a wrapped stack 9 of aluminium plates has been placed on bottom panel 23, transverse wall sections 24 and 25 are inwardly folded to constitute buffers shown in broken lines 26 and 27. The particular triangular design of the buffers near their corners prevents the corners of the plates from cutting the wrapping material since there is no anvil to cut on. Next, longitudinal wall sections 28 and 29 are folded over the plate stack and the buffers to close the package and keep it that way by means of a suitable adhesive, a self-adhesive tape or the like. An etui as described hereinbefore is disclosed in Research Disclosure 34303 of November 1992.

Figures 2D, 2E:
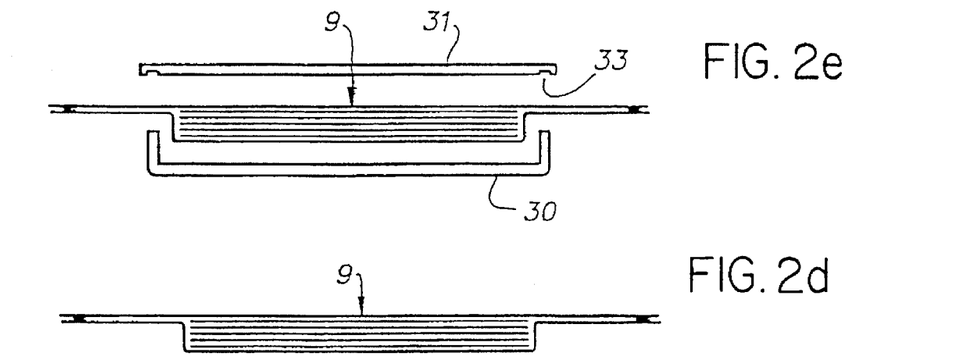

The etui thus described is opened, the plate pack is taken out and the flaps are unfolded as shown in FIG. 2d.

Then the pack is placed in a clamping arrangement allowing the wrapper to be cut open (see FIG. 2e). This arrangement may comprise a tray-like base 30 and a cover 31. Tray and cover may be separate elements, one embodiment being illustrated in FIGS. 5c to f in the form of a telescope-type box, but they may also be parts of a mechanism arranged in a drawer or the like making part of a lighttight device which in the open position allows the package to be placed in tray 30, mounted e.g. on the bottom of the drawer, cover 31 to be placed in lighttight contact on the tray while withheld by suitable clamping means as shown diagrammatically by clamps 32 in broken lines in FIG. 2f, and then the outwardly extending portion of the wrapper to be cut, as represented diagrammatically by knife 34, and next removed. Lighttight engagement of cover 31 with tray 30 can be improved by a labyrinth-like lock 33.

Tray 30 need not necessarily be a base with upstanding metal walls as shown, but may in its simplest form even be a rectangular framework, open on top and bottom, the four upstanding walls of which co-operate with cover 31.

In a similar way, the function of cover 31 can likewise be performed by a frame-like structure co-operating with the bottom frame to provide uninterrupted clamping surfaces.

The drawer is then lighttightly closed and appropriate means in lighttight device 35 shown in broken lines (see FIG. 2g), open the clamps, lift cover 31, remove the upper wrapper foil 11, and take out the printing plates one by one. Removal of wrapping foil 11 can occur by suction cups or the like but said foil can also have been previously attached with its extending margins to cover 31 by means of strips of self-adhesive tape, by clamps, etc.

Figure 2F:
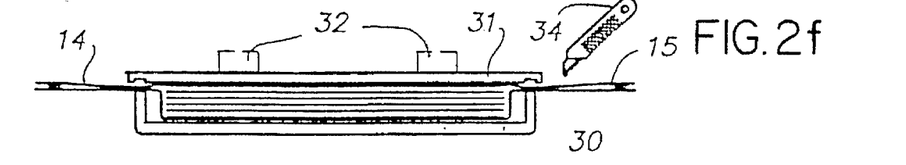
Figure 2G:
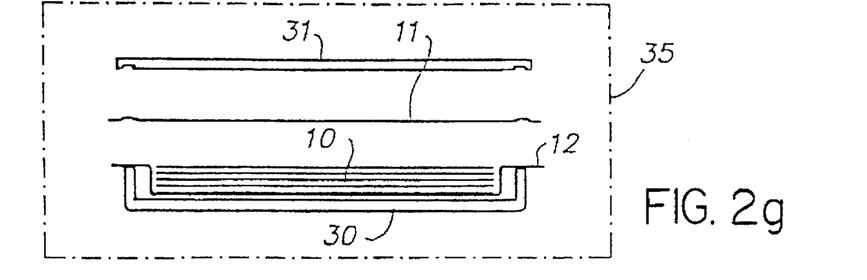

The position of the package for its opening is horizontal in FIGS. 2e to g, but it is clear that it may be slanting as well, e.g. tilted 10 angular degrees with respect to the vertical. This has the advantage that the foot print of the device can be considerably reduced and that removal of wrapper 11 can occur occasionally by gravity. The use of gravity may likewise be interesting in case the printing plates are separated from each other by interleaving foils. Removal of a plate causes the thin interleaving foil covering the next plate to slightly buckle by the air withdrawal whereby it can fall over the bottom edge Of the tray into a foil collector.

Removal of the plates from the stack can occur by suction cups, friction fingers or rollers, fingers engaging perforations in one of the margins of the sheets, as known in the art.

FIGS. 4a to 4g show a second embodiment of the method according to the invention which differs from the first one by the way in which the wrapper is lighttightly closed. A plate stack 10 is enclosed between two lighttight wrapping foils 40, 41 that may be similar to foils 11, 12 except for a thermoplastic sealing layer which is not needed in the present embodiment. Marginal portions of the extending flaps of the wrapper are backfolded in small folds 43 which can be temporarily fixed to the wrapper by means of some strips of self-adhesive tape 45 so as not to unroll spontaneously. Closed flaps 14 and 15 (only two of the four flaps being shown) are folded over the stack, and then the package is packed in a holder (see FIG. 4c), which can be an etui as described hereinbefore.

Figure 4A:
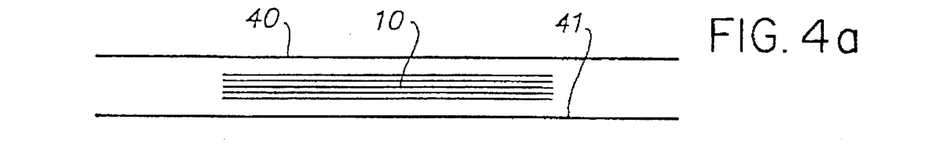
FIGS. 4a–4g illustrate a second embodiment of the inventive method.
Figure 4B:
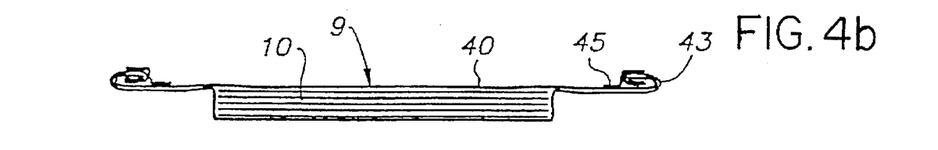
Figure 4C:
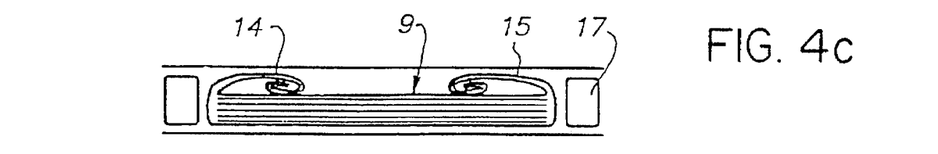
Figure 4D:
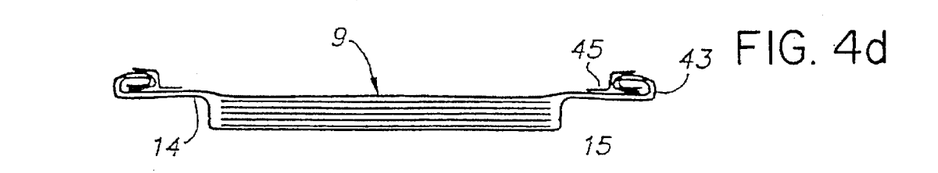
Figure 4E:
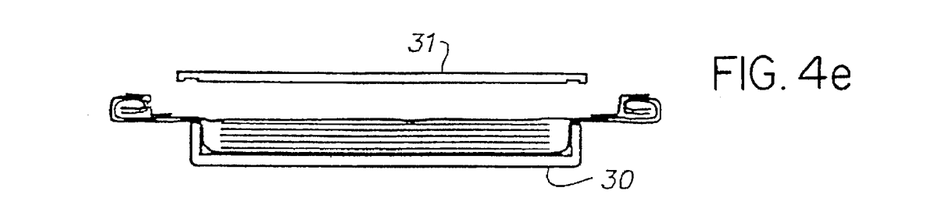
Figure 4F:
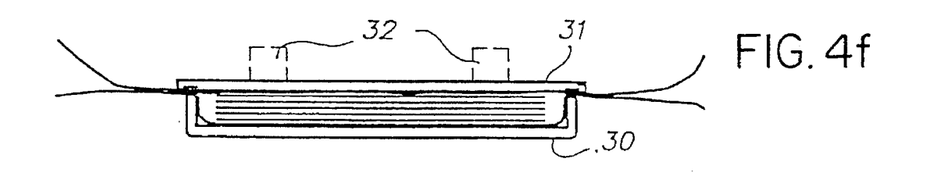
Figure 4G:
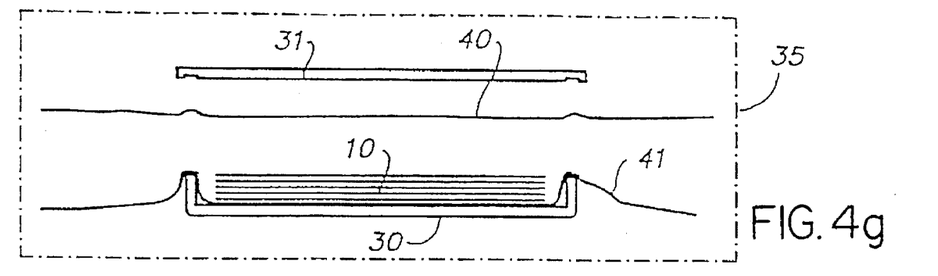

The user of the plates removes plate package 9 from the etui, unfolds flaps 14 and 15, see FIG. 4d, and puts the package in a clamping arrangement 30, 31 that may be similar to the one shown in FIG. 2e. Removal of sealing strips 45 allows unrolling of folds 43 and this opens the wrapper the contents of which, however, remains lighttight because of the closure produced by cover 31 and base 30. The package thus prepared is then moved into a lighttight device 35 as described with reference to FIG. 2g.

FIG. 5 illustrates one embodiment of a package according to the present invention. A stack of printing plates 10 is lighttightly wrapped between two foils 40, 41 with folded marginal portions 43 as described hereinbefore and put in a full telescope set-up box having a base 44, and a cover 46. This box is a package made of non-bending boxboard, having a thickness assuring sufficient rigidity to the loaded box (ja?). The box forms a shipping carton for the sheet pack and can be sealed by a warranty label.

Figure 5A:
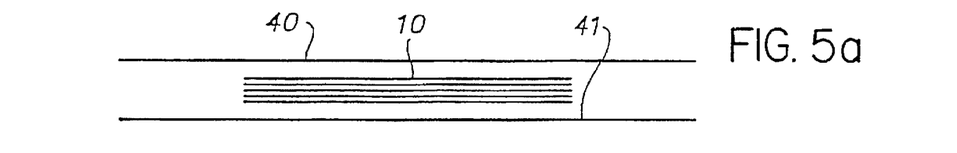
FIGS. 5a–5g illustrate the use of one embomdiment of a package according to the invention.
Figure 5B:
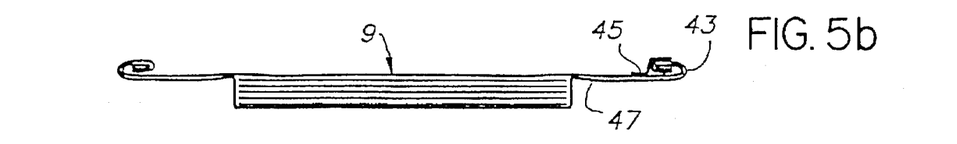
Figure 5C:
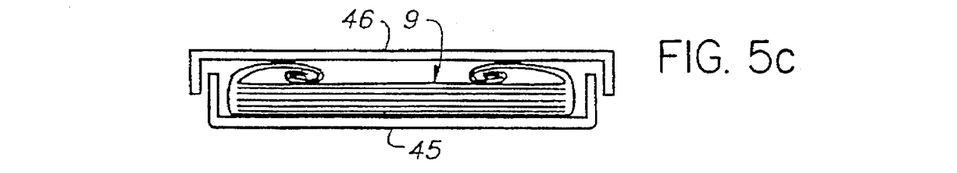
Figure 5D:
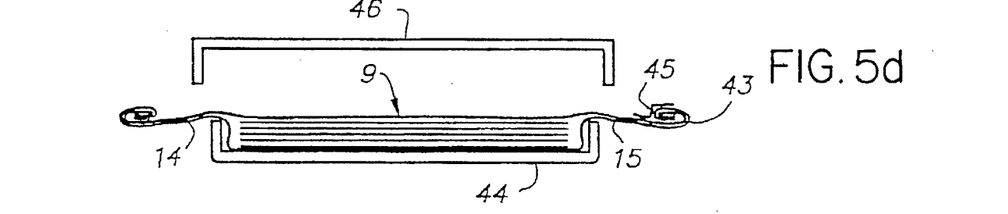
Figure 5E:
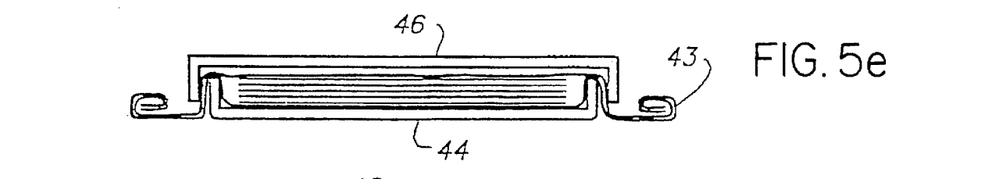
Figure 5F:
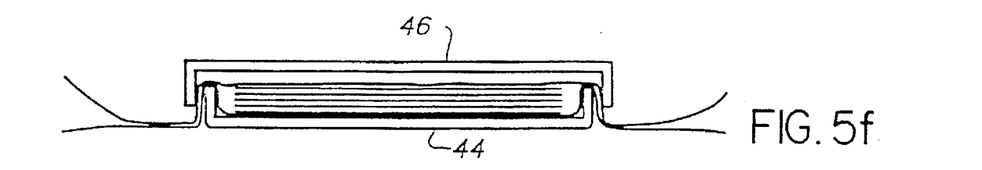

The user opens the box, unfolds flaps 14 and 15 of plate package 9 (see FIG. 5d), and next replaces cover 46 on base 44 (see FIG. 5e). Portions of the wrapping foils deflected by the co-operating lateral walls of the box provide an efficient light lock for the contents of the box.

Figure 5G:
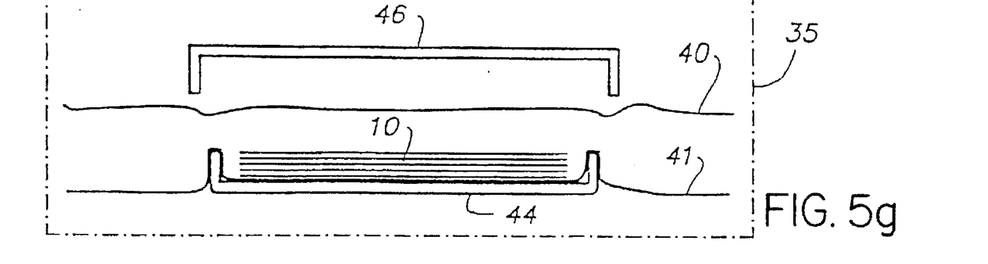

Then backfolded portions 43 of the wrappers are unrolled after locking tapes 45 have been removed (see FIG. 5f), and the plate pack thus prepared is put in device 35 of a type as described hereinbefore but which has appropriate means for cover 46 to be lifted from base 44.

Opening the package has been illustrated in the present drawings as occurring by means of a simple knife 34, 56 for the sake of simplicity. In practice, safety tools or systems will be used for opening a wrapper, such as a knife-like envelope opener, scissors, a tearstrip, etc.

The invention has been described so far with reference to flat stacks of sheetlike material, but it should be understood that the invention also covers web- and sheetlike material wound into a roll. Suchlike roll can likewise be lighttightly wrapped between two wrapping foils, and then be accomodated in a suitable base allowing lighttight clamping while the wrapping is cut open. Then the clamped roll is loaded into a lighttight unloading device, the clamps are opened and the light-sensitive material can be suitably dispensed from the roll.

I claim:

1. A method for lighttighly wrapping a photographic light-sensitive material and loading it by daylight in a lighttight cabinet arranged for removing said wrapper at least partly to set the light-sensitive material free for further treatment, characterised by the steps of:

clamping a package comprising a light-sensitive material (10) wrapped in a flexible lighttight wrapper (11,12) having a peripheral lighttight closure (13) the location of which is spaced from the periphery of said light-sensitive material, between clamping means (30,31) engaging the wrapper of the package along a peripheral clamping zone located between the peripheral lighttight closure of the wrapper and the periphery of the wrapped material to lighttightly clamp two adjacent plies of the wrapper onto each other, opening the lighttight wrapper along said peripheral lighttight closure, and locating the thus clamped and opened package in said opened cabinet, lighttightly closing said cabinet, opening the clamping means and removing the wrapper at least partly from said package to set free said light-sensitive material.

2. The method of claim 1, wherein said peripheral lighttight closure is opening by separating one of said plies of said wrapper from the other ply thereof generally along said closure and further comprising locating said clamped and opened package in a tilted position in said cabinet to remove the thus-separated one ply of said opened wrapper by gravity when the clamping means is opened.

3. A method according to claim 1, wherein the lighttight closure (13) of the wrapper is formed by a peelable seal, and said opening of the package occurs by peeling said seal.

4. A method according to claim 1, wherein the lighttight closure (13) of the wrapper is formed by a non-peelable seal, and said opening of the package occurs by cutting at least one of said two adjacent plies (11,12) along a peripheral line located between said peripheral clamping zone and said seal.

5. A method according to claim 4, comprising cutting said two adjacent plies (11,12) of said wrapper simultaneously.

6. A method according to claim 1, wherein the lighttight closure of the wrapper is formed by back-folded marginal portions (43) of two congruent wrapping sheets (40,41).

7. A method according to claim 6, wherein said marginal portions (43) are backfolded to and temporarily withheld at a position where they remain beyond the reach of said clamping means.

8. A method according to claim 7, wherein said back-folded marginal portions (43) are withheld from spontaneous unfolding by tabs (45).

9. A method according to claim 8, wherein said tabs are strips of self-adhesive tape.

10. A method for daylight loading a photographic light-sensitive material into a lighttight cabinet adapted to be opened for loading which comprises the steps of:

wrapping said photographic light-sensitive material in a light-impervious wrapper and providing said wrapper with a first lighttight closure spaced from the edges of said material, providing said wrapper with a clamping, second lighttight closure inward of said first closure and capable of taking over the function of the first closure, opening said first closure in daylight, opening said cabinet and loading said wrapped photographic material while still closed by said second closure in said opened cabinet, and lighttightly closing said cabinet, unclamping said second closure and removing the wrapper at least partly from the light-sensitive material to render the latter accessible to processing.

11. A method according to claim 10, wherein said clamping means are formed by two co-operating peripheral clamping surfaces that can be urged onto each other.

12. A method according to claim 11, wherein one of said clamping surfaces belongs to an open holder (30) into which said package can fit, and the other one belongs to a cover (31) for closing such holder.

13. A method according to claim 10, wherein said clamping means are formed by the lateral walls of the base (44) and the lid (46) of a telescopic type set-up box.

14. A method according to claim 13, wherein said set-up box forms a shipping carton for the photographic material.

15. A method according to claim 12, wherein said clamping surfaces provide a labyrinth-like closure (33).

16. A method according to claim 10, wherein said wrapper is airtightly sealed along its margins.

17. A method according to claim 16, wherein said package is a low-air-content package.

18. A method according to claim 10, wherein said light-sensitive material is formed by a stack of light-sensitive sheets.

19. A method according to claim 18, wherein said sheets are aluminium lithographic printing plates.

20. A photographic sheet package comprising a base comprised of four upstanding side walls arranged in continuous rectangular relation to define an interior space of a given width and length, said side walls having top edges lying substantially in a common plane; fitting with said space a stack of light-sensitive sheets disposed between two rectangular sheets of lighttight wrapping foil, said stack having a length and width not greater than that of said space and the foil sheets having a width and length significantly larger than that of said space to form flaps which are loosely sandwiched together and extend beyond said stack, said flaps passing over said top edges of said side walls to project generally laterally exteriorly of said base and terminating in free edges derived by opening of an initial lighttight closure of peripheral margins of said foil sheets; and a removable light-impervious rectangular cover for said base having peripheral margins overlying said top edges of the base side walls, the cover margins being in lighttight clamping contact with said top edges of said base with the wrapping sheet flaps gripped and lighttightly closed therebetween along loci inwardly of said free edges of said flaps, whereby removal of said cover frees an upper one of said foil wrapping sheets for separation from the stack to give access to said stack.

21. A photographic sheet package according to claim 20, wherein said cover comprises a rectangular top wall and side walls extending generally downwardly from peripheral edges of said top wall in close-fitting telescopic relation to said side walls of said base with a portion of the laterally projecting flaps of said foil sheets deflected betweeen the telescoping side walls of the base and cover.

22. A photographic sheet package according to claim 20 wherein said base further comprises a light impervious bottom wall and said side walls extend generally vertically from peripheral edges of said bottom wall.

* * * * *

UNITED STATES PATENT AND TRADEMARK OFFICE
CERTIFICATE OF CORRECTION

PATENT NO. : 5,649,411

DATED : July 22, 1997

INVENTOR(S) : LIEVEN DIRX

It is certified that error appears in the above-identified patent and that said Letters Patent is hereby corrected as shown below:

Col. 6, line 37, change "opening" to --opened--.

Col. 7, line 16, change "10" to --1--.

Col. 7, line 23, change "10" to --1--.

Col. 8, line 7, change "with" to --within--.

Col. 8, line 30, change "betweeen" to --between--.

Signed and Sealed this

Second Day of December, 1997

Attest:

BRUCE LEHMAN

Attesting Officer

Commissioner of Patents and Trademarks